Oct. 27, 1970     C. R. CORDELL, JR     3,535,813
FISH LURE
Filed May 24, 1968
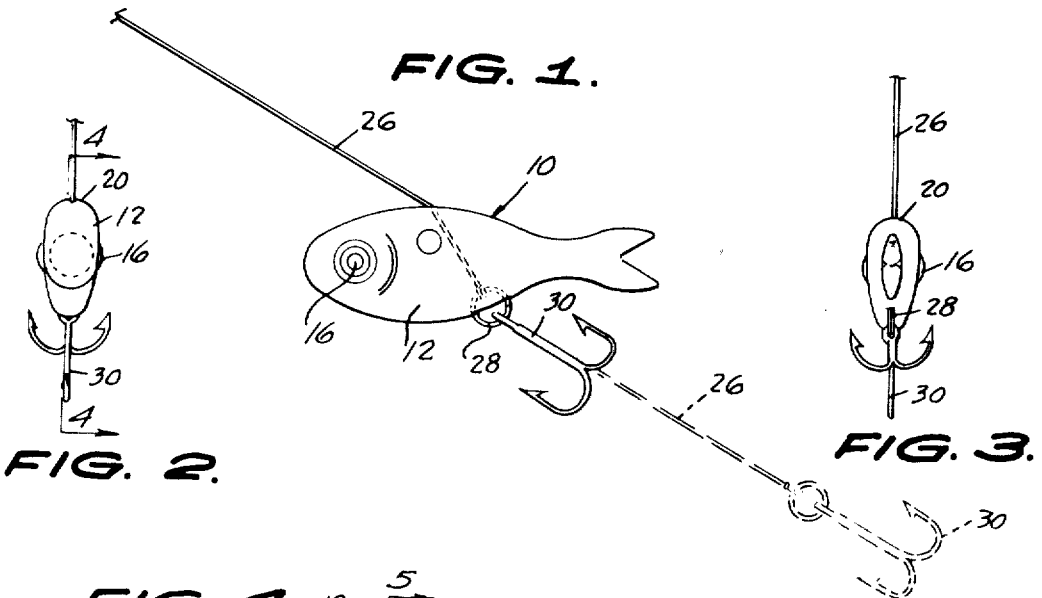
INVENTOR.
CARL R. CORDELL, JR.

United States Patent Office 3,535,813
Patented Oct. 27, 1970

1

3,535,813
FISH LURE
Carl R. Cordell, Jr., P.O. Box 2020, 215 Idlewood Drive,
Hot Springs, Ark. 71901
Filed May 24, 1968, Ser. No. 731,796
Int. Cl. A01k 85/00
U.S. Cl. 43—42.05                        3 Claims

ABSTRACT OF THE DISCLOSURE

A weighted fish lure which will vibrate when retrieved. The hooks of the lure are attached to a swivel snugly received within a cavity in the body of the lure. When the lure is retrieved the body can rock about the swivel and the hooks will not interfere with the action of the lure. The hooks will also pull away from the lure body when struck by a fish thereby minimizing the risk of the fish freeing itself by exerting leverage on the lure body.

---

This invention relates to a novel fish lure.

It is an object of this invention to provide a fish lure which is so balanced as to vibrate when retrieved in water, thereby simulating the motion of a real fish.

Another object of this invention is to provide a fish lure of the character indicated whose hooks are attached to the lure in such a manner as not to interfere with the vibrating action of the lure.

A further object of this invention is to provide a fish lure whose hooks will not tangle with the lure body during casting.

A still further object of this invention is to provide a fish lure having hooks which can pull away from the lure body so an angler can effectively play a hooked fish and which will preclude the fish from exerting leverage against the lure to work itself free.

Yet another object of this invention is to provide a fish lure of the character indicated which comprises a minimum number of components, is simple in construction and can be economically produced.

Further objects and advantages of the invention will become apparent from the following description and claims, and from the accompanying drawings, wherein:

FIG. 1 is a side view in elevation of the fish lure comprising the subject matter of the instant invention;

FIG. 2 is a front elevational view of the fish lure shown in FIG. 1;

FIG. 3 is a rear elevational view of the fish lure shown in FIG. 1;

FIG. 4 is a cross-sectional view taken substantially along the plane indicated by line 4—4 of FIG. 2;

FIG. 5 is a cross-sectional view taken substantially along the plane indicated by line 5—5 of FIG. 4;

FIG. 6 is a longitudinal sectional view through the fish lure shown in FIG. 1; and FIG. 7 is a bottom plan view of the fish lure shown in FIG. 1.

Referring now to the drawing in detail wherein like numerals indicate like elements throughout the several views, the fish lure of the present invention is generally indicated by the numeral 10.

Fish lure 10 includes a molded or cast plastic body 12 shaped to simulate a bait fish. A cavity 14 is formed through plastic body 12 at the portion normally simulating the eye of the bait fish. A lead weight 16 is press-fitted into cavity 14. Alternatively, plastic body 12 can be molded around weight 16.

A narrow bore 18 is drilled through the body portion 12 of lure 10 and extends from its top surface 20 to its bottom surface 22. Bore 18 is slanted at an angle to the vertical axis of body portion 12 and extends from approximately the midpoint of top surface 20 towards the rear portion of bottom surface 22. Bore 18 is enlarged at its lower extremity to provide a substantially semi-circular cavity 24.

Fishing line 26, attached to a reel (not shown), is inserted through bore 18. The free end of line 26 is secured to a circular swivel 28. A conventional three-prong hook 30 is carried by swivel 28.

In operation, when lure 10 is cast, line 26 will become taut, and the body portion 12 of lure 10 will slide up and then down line 26 until swivel 28 snugly fits in cavity 24. This will prevent the hook 30 from becoming tangled with body portion 12 by undue lateral swinging motion during casting.

Once in the water, as lure 10 is retrieved, weight 16 will cause lure 10 to dip forwardly periodically, and rock about swivel 28, setting up a vibrating action in the lure to simulate the actual swimming motion of a bait fish. Swivel 28 enables the hook 30 to swing freely so as not to interfere with the vibrating action of the lure 10. If hook 30 was held snugly against body portion 12, lure 10 would not rock about swivel 28 but would be held immobile in a tilted position.

If a fish should strike lure 10 and become impaled upon hook 30, hook 30 can be pulled away from lure body portion 12. This will enable the angler to effectively play the fish as the fish cannot exert any leverage against body portion 12 to work itself free.

While a specific embodiment of my invention has been disclosed in the foregoing description, it will be understood that various modifications within the spirit of the invention may occur to those skilled in the art.

What I claim is:

1. A fish lure designed to simulate the appearance and motion of a bait fish comprising: a body portion; a bore through said body portion extending downwardly from the forward end of the body portion toward its rear end and being adapted to slidably receive a fish line therethrough; means for producing gentle vibrations of the body portion about a horizontal axis during retrieval from the water, said vibrations simulating the undulating motion of a bait fish, said means comprising a concentrated weight internally secured at the forward end of the body portion at its approximate eye position; a hook member at the free end of said fish line disposed toward the rear end of said body portion; means connecting said hook member to said fish line and for spacing said hook member from the bottom surface of said body portion thereby providing unrestricted pivotal motion of said hook member concomitant with the undulating motion of said body portion, said spacing means including a circular swivel ring rotatably positioned in said body portion; an enlarged semicircular cavity being provided at the bottom of said body portion and communicating with said bore and for receiving said swivel ring, said semicircular cavity having a rectangular-shaped entrance substantially the same size as the ring diameter to snugly receive said ring.

2. A fish lure in accordance with claim 1 having a cavity in its forward end, and said weight is press-fitted into said cavity.

3. A fish lure in accordance with claim 1, wherein said body portion is made of plastic.

References Cited

UNITED STATES PATENTS

| 2,538,484 | 1/1951 | Tenn | 43—42.39 X |
| 2,181,254 | 11/1939 | Wilson | 43—42.05 |
| 2,373,417 | 4/1945 | Rosegard | 43—42.05 |
| 2,516,468 | 7/1950 | Klein | 43—42.08 |
| 2,734,301 | 2/1956 | Fuqua | 43—42.05 |
| 2,778,143 | 1/1957 | Bratz | 43—42.05 |
| 3,010,243 | 11/1961 | Dickinson | 43—42.05 X |

SAMUEL KOREN, Primary Examiner

D. J. LEACH, Assistant Examiner

U.S. Cl. X.R.

43—42.39